United States Patent [19]

Zedonis

[11] Patent Number: 5,637,926

[45] Date of Patent: Jun. 10, 1997

[54] BATTERY POWERED ELECTRONIC ASSEMBLY FOR WHEEL ATTACHMENT

[75] Inventor: David L. Zedonis, Fishers, Ind.

[73] Assignee: Delco Electronics Corp., Kokomo, Ind.

[21] Appl. No.: 603,138

[22] Filed: Feb. 20, 1996

[51] Int. Cl.⁶ .................................................. B60C 23/04
[52] U.S. Cl. ................... 307/10.1; 73/146.3; 200/61.22; 340/442
[58] Field of Search .................................. 307/9.1, 10.1, 307/118, 150; 361/758, 759, 742, 740, 743; 73/146.2–146.5; 340/442–448; 152/415, 418; 200/61.22–61.26

[56] References Cited

U.S. PATENT DOCUMENTS

| | | | |
|---|---|---|---|
| 2,860,321 | 11/1958 | Strickland et al. | 340/447 |
| 4,134,102 | 1/1979 | Stewart et al. | 340/445 |
| 4,286,253 | 8/1981 | Nagy | 340/447 |
| 4,311,985 | 1/1982 | Gee et al. | 340/447 |
| 4,319,220 | 3/1982 | Pappas et al. | 340/447 |
| 4,723,445 | 2/1988 | Ripley et al. | 73/146.5 |
| 5,040,561 | 8/1991 | Achterholt | 73/146.5 |
| 5,109,213 | 4/1992 | Williams | 340/447 |
| 5,285,189 | 2/1994 | Nowicki et al. | 340/447 |
| 5,540,092 | 7/1996 | Handfield et al. | 73/146.5 |

*Primary Examiner*—Richard T. Elms
*Attorney, Agent, or Firm*—Mark A. Navarre

[57] ABSTRACT

A low tire pressure system has a transmitter inside a vehicle tire attached to the wheel rim. A housing has an outboard wall perpendicular to a wheel radius and an inner flange around the wall periphery. A battery is mounted on the circuit board through an intermediate support frame. Battery leads extending through snug holes in the support frame are soldered to the circuit board to achieve a unitized assembly. The assembly is installed in the housing with the circuit board parallel to the wall and its margin bearing on the inner flange. Centrifugal force developed on the battery is transferred by the support frame through the board margins to the flange without bending the circuit board.

10 Claims, 2 Drawing Sheets

5,637,926

BATTERY POWERED ELECTRONIC ASSEMBLY FOR WHEEL ATTACHMENT

FIELD OF THE INVENTION

This invention relates to an electronic assembly for attachment to the wheel of an automotive vehicle and especially to such an assembly having means for supporting a battery.

BACKGROUND OF THE INVENTION

To enhance the service of motor vehicle tires it is proposed to measure tire pressure continuously or intermittently and automatically warn the vehicle operator when a low tire pressure is detected. This is accomplished by an electronic pressure transmitter unit including a battery, a pressure sensor and a circuit board including a radio transmitter, and a radio receiver and warning means within the vehicle to effect a warning when the transmitter issues a warning signal. The transmitter is on the wheel inside the tire so that the unit is constantly subject to the tire pressure.

The transmitter is mounted on the outside diameter "drop center" of the wheel rim and is inside the tire. AM transmissions are broadcast from the device on a speed transition and on a low tire pressure threshold transition. The device is battery powered for a design life of several years. During this period, the transmitter will encounter the environment of 125° C., three axis 100 G shock, 1000 G centrifugal force loading, and extremes of humidity. The substantial mass of the battery under these conditions could impose substantial stress on the circuit board which could result in failure of solder joints.

One design approach for such transmitters is to mount the circuit board and battery radially, but experience with this configuration has led to reliability problems; it is suspected that the problem stems from the centrifugal force loading on the solder joints. Another approach has been to pot the unit in epoxy. This hard substance introduces several potential problems. The epoxy has a high coefficient of thermal expansion and can add stress to solder joints. The epoxy also adds substantial mass which is undesirable for an application with such large G forces.

SUMMARY OF THE INVENTION

It is therefore an object of the invention in a tire pressure transmitter to support battery load with minimal stressing of solder joints of the circuit board under high load conditions. Another object in such a device is to support the circuit board for minimum bending in an area of high component density. Another object in such a device is to positively locate the battery relative to the circuit board.

An elongated housing having a concave base for mounting on the outer diameter of a wheel rim has a pair of mounting feet which contact the rim and are bound to the rim by a band which encircles the rim. The concave side of the housing contains an opening and a cover which closes the opening. A housing wall opposite the opening is perpendicular to the wheel radius, and has an inner flange around its periphery for supporting a circuit board at its margins and holding it parallel to the wall so that centrifugal forces only exert compressional force on the solder joints. Ribs extending across the wall provide additional support. A battery support comprises a frame having side rails bearing on the margins of the circuit board. A battery on the support has leads extending through holes in the support to the circuit board. The battery, support and circuit board along with inertial and pressure switches are assembled and joined by solder joints of the leads to the circuit board. The cover may bear against the battery to hold the unitized assembly against the flanges and ribs of the wall.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
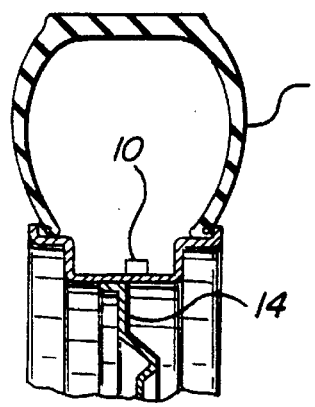
FIG. 1 is a partial cross-sectional view of a wheel including a low tire pressure warning transmitter assembly according to the invention.
Figure 2:
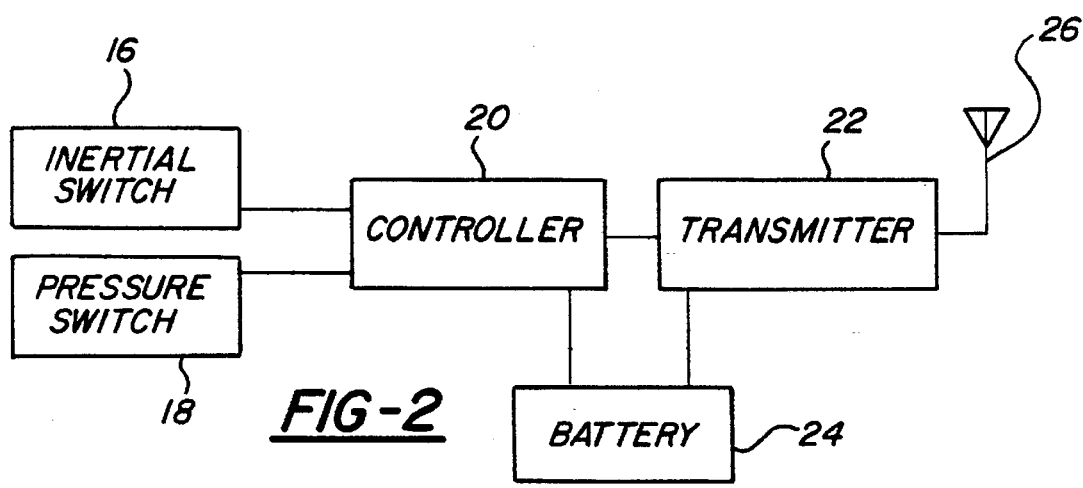
FIG. 2 is a block diagram of the circuit of the transmitter assembly of FIG. 1.

Referring to FIGS. 1–2, a transmitter 10 for a low tire pressure warning system is mounted on a vehicle wheel within the tire 12. The transmitter is seated on the outer diameter of the drop center of rim 14.

The transmitter 10 comprises an assembly of an inertial switch 16 (if required), a pressure switch 18, a controller 20, a transmitter circuit 22, an antenna 26 and a battery 24 incorporated on a circuit board 28. In operation, the inertial switch 16 senses a tire rotation speed threshold and triggers the controller 20 to issue a state of health message via the transmitter 22, to assure that the transmitter assembly is operative. The pressure switch 18 senses a decrease of tire pressure below a threshold and causes the controller to send a warning signal.

Figure 4:
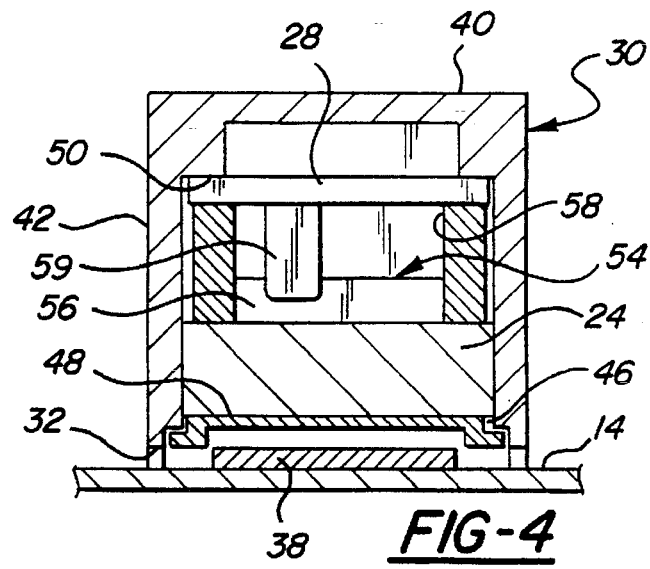
FIG. 4 is a cross section of the transmitter assembly taken along line 4—4 of FIG. 3.
Figure 3:
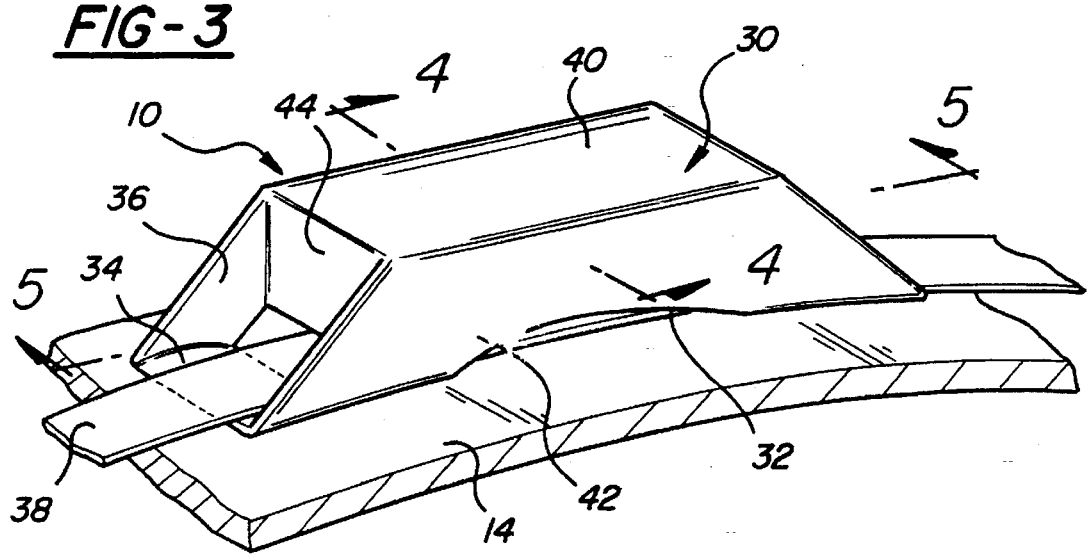
FIG. 3 is an isometric view of the transmitter assembly of FIG. 1, according to the invention and a broken-away portion of the wheel.
Figure 5:
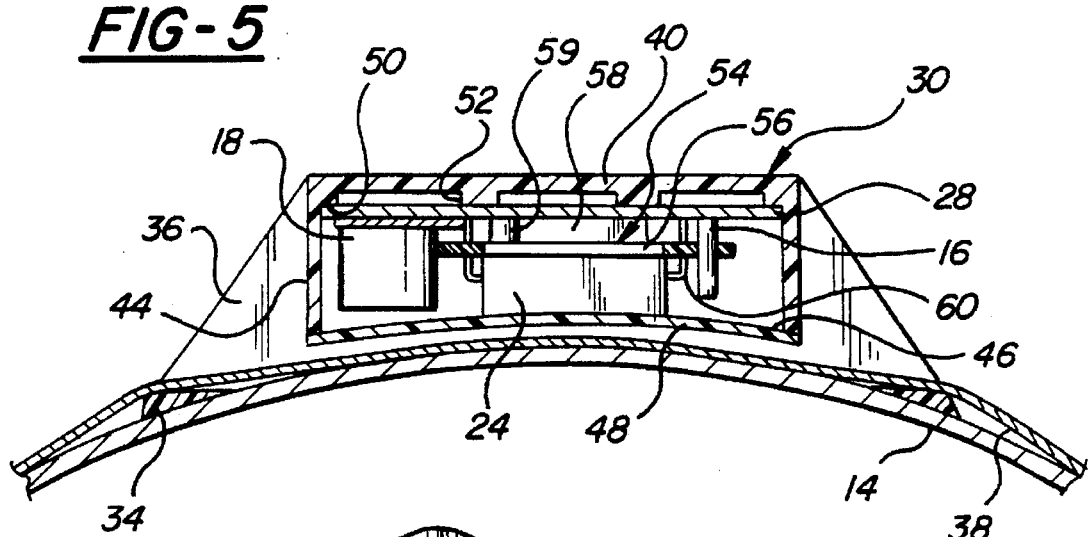
FIG. 5 is a cross section of the transmitter assembly taken along line 5—5 of FIG. 3.
Figure 6:
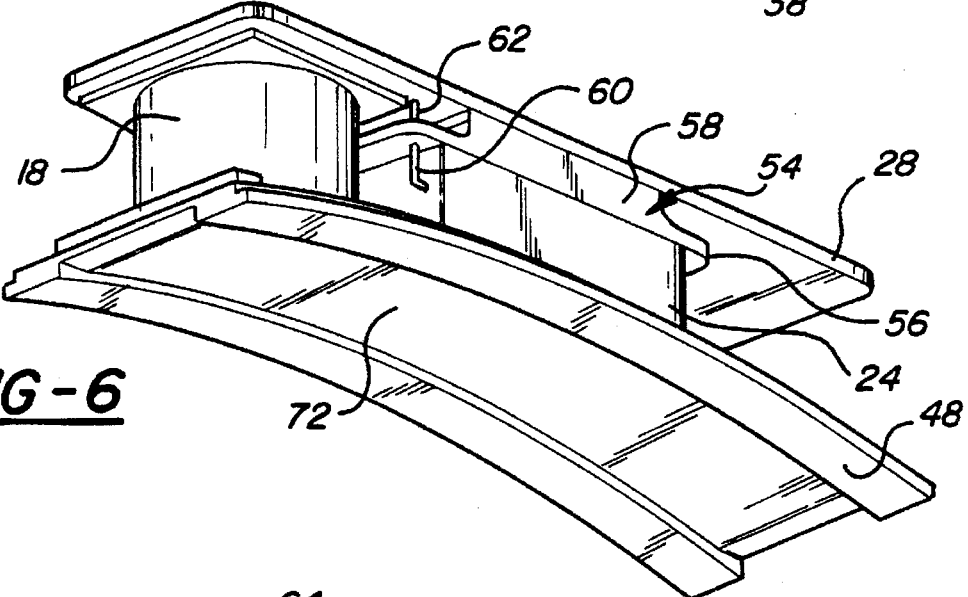
FIG. 6 is an isometric view of the transmitter assembly according to the invention, less the housing.
Figure 7:
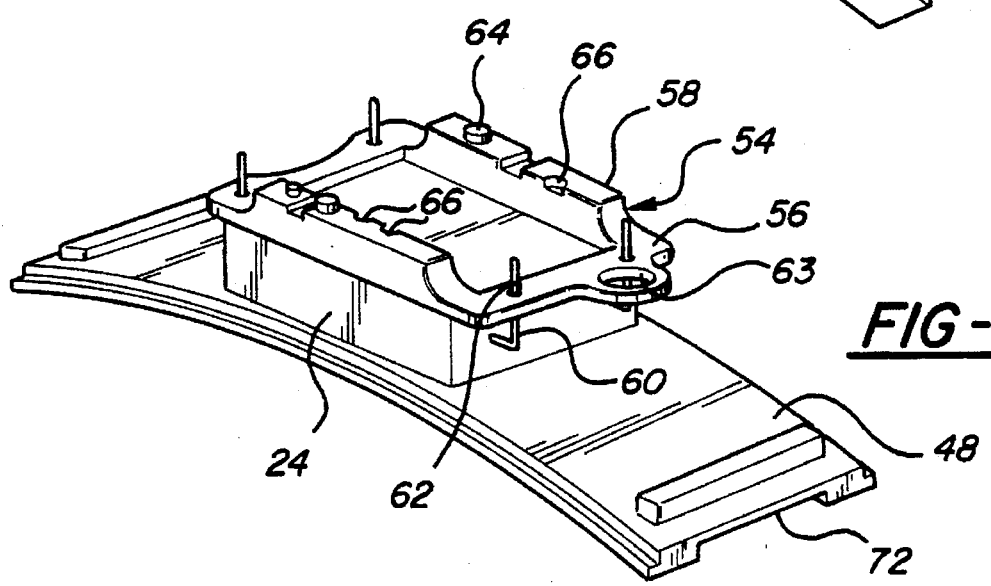
FIG. 7 is an isometric view of a cover, battery support and battery of the transmitter assembly according to the invention.

FIGS. 3–5 show the transmitter 10 secured to the rim 14. The transmitter has an elongated housing 30 having a concave base 32 adjacent the rim 14. A foot 34 on either end of the housing, supported by filets 36, is spaced from the base. The feet 34 are held against the rim 14 by a band 38 which encircles the rim, passes over the feet and passes underneath the concave base 32. The clearance between the rim 14 and the concave base 32 is a variable, dependent on the rim diameter. The housing has a support wall 40 opposed to the base 32 and disposed perpendicular to a wheel radius. Side walls 42, contiguous with the filets 36, and end walls 44, inboard of the feet 34, define a generally rectangular enclosure. An opening 46 in the base 32 is closed by a cover 48 which is also concave.

The support wall 40 is the main load bearing member of the housing, keeping in mind that centrifugal force pushes the housing contents against the wall 40. The internal face of the wall 40 has a peripheral flange 50 along the side walls 42 and the end walls 44, and a pair of transverse ribs 52 of the same height as the flange. The margin of the circuit board 28 lies flat against the flange 50 and the ribs 52 support intermediate portions of the circuit board. Preferably the board margin and the areas touching the ribs would be free of solder joints or other irregularities to avoid creating localized stress, but if such features are necessary in those locations relief recesses are provided in the flange and ribs to accommodate them. The components are concentrated in the area between the ribs and the flange where local bending of the circuit board is minimal.

A battery support 54, shown in FIGS. 4–7, comprises a generally rectangular frame 56, open in the center, with side rails 58 which extend to the side margins of the circuit board 28 opposite the flange 50. The side rails and the open center provide room for components 59 on the circuit board between the board and the battery. The battery 24 is held on the side of the support furthest from the circuit board and has leads 60 which extend through apertures 62 in the frame 56 to the circuit board 28. The apertures 62 are sized to snugly grip the leads 60 to hold the battery against movement on the support. The pressure switch 18 is housed adjacent to an end of the battery and is attached to the circuit board. One end of the frame 56 is concave to accommodate the cylindrical shape of the pressure switch. The inertial switch 16 is a small diameter cylinder positioned adjacent the other end of the battery and disposed perpendicular to the circuit board. An end of the frame 56 extends beyond the site of the inertial switch and contains a hole 63 to receive the switch, thereby lending lateral support. The faces of the side rails 58 which contact the circuit board each have a projecting locating pin 64 which mates with a corresponding hole (not shown) in the circuit board to positively position the support on the circuit board. The rail faces also have several relief areas 66 to accommodate solder joints near the board margin. The frame opening provides room for mounting components on the side of the board facing the battery.

The cover 48 is concave to conform to the shape of the base and has stepped side edges 68 which snugly snap into the opening 46. Alternatively, the cover 48 is adhesively secured to the battery, thus allowing for tolerance stack-up. The outer edge of the cover has a central channel 72 along its length to receive the band 38. The width of the battery fills the housing so that lateral movement is prevented as well.

The battery 24, support 54 and circuit board 28 are pre-assembled, along with the switches 16 and 18. The battery leads 60 and leads from the switches and other components, not shown, are joined to the circuit in a wave-soldering operation. Assembling the parts prior to soldering eliminates stack-up tolerances and results in a unitized structure. The locating pins 64 and the leads 60 hold the support 54 in place on the circuit board 28 and the leads 60 hold the battery 24 against movement on the support 54. After soldering, the assembly is inserted into the housing and the cover is pressed in place. The cover, in its final position, engages the battery and snugly urges the unitized assembly against the flanges 50 and ribs 52 of the wall 40.

The embodiments of the invention in which an exclusive property or privilege is claimed are defined as follows:

1. An electronic assembly for mounting on a vehicle wheel rim inside a tire comprising:
   a housing having a wall;
   the housing having a base for mounting on said wheel rim to hold the wall perpendicular to a wheel radius;
   a circuit board disposed between the housing base and wall, parallel to the wall and having margins engaging the wall;
   a battery support disposed between the circuit board and base, having a frame engaging margins of the circuit board opposite to said wall so that the margins of the circuit board are gripped between the wall and the frame; and
   a battery carried on the frame and spaced from the circuit board, whereby centrifugal force developed on the battery due to rotation of the vehicle wheel rim is applied to the wall of the housing through the frame of the battery support and the margins of the circuit board.

2. The invention as defined in claim 1 wherein:
   the circuit board has locating holes in the margins;
   the frame has a pair of lateral rails for engaging the circuit board; and
   the rails have depending locating pins for mating with the locating holes, thereby fixing the position of the frame relative to the circuit board.

3. The invention as defined in claim 1 wherein:
   the frame has a pair of lateral rails for engaging the circuit board; and
   the rails have relief areas for accommodating solder bumps on the circuit board.

4. The invention as defined in claim 1 wherein:
   the battery has leads extending to the circuit board; and
   the support has an aperture for each lead whereby the leads pass through the respective apertures to secure the battery position on the support.

5. The invention as defined in claim 1 wherein:
   the base contains an opening for access into the housing; and
   a cover fits over the opening to close the housing and to engage the battery, whereby the battery, the support and the circuit board are sandwiched between the wall and the cover.

6. The invention as defined in claim 1 wherein:
   the housing is elongated in the direction of wheel rotation; and
   the wall has an inner surface facing the base, the inner surface having a flange around its periphery engaging the margin of the circuit board, whereby the margin of the circuit board is gripped between the frame of the battery support and the flange.

7. The invention as defined in claim 1 wherein:
   the inner surface of the wall has a flange around its periphery for supporting the margin of the circuit board; and
   the inner surface of the wall has transverse ribs for supporting the circuit board, whereby the circuit board is preventing from bending under centrifugal load.

8. The invention as defined in claim 1 wherein:
   the assembly includes a switch positioned adjacent the battery; and
   the battery support includes an opening for receiving the switch and holding the switch against lateral movement.

9. The invention as defined in claim 1 wherein the battery includes terminals which extend to the circuit board through openings in the battery support, and the circuit board, battery support and battery comprise a unitized assembly held by solder connections joining the terminals of the battery to the circuit board.

10. The invention as defined in claim 1 wherein the battery includes terminals which extend to the circuit board through openings in the battery support, and the circuit board, battery support, battery and a pressure switch comprise a unitized assembly held by solder connections joining the terminals of the battery to the circuit board.

* * * * *